Feb. 19, 1957     K. B. KIDD     2,781,955
MEASURING DISPENSER FOR GRANULAR MATERIALS
Filed Feb. 3, 1956
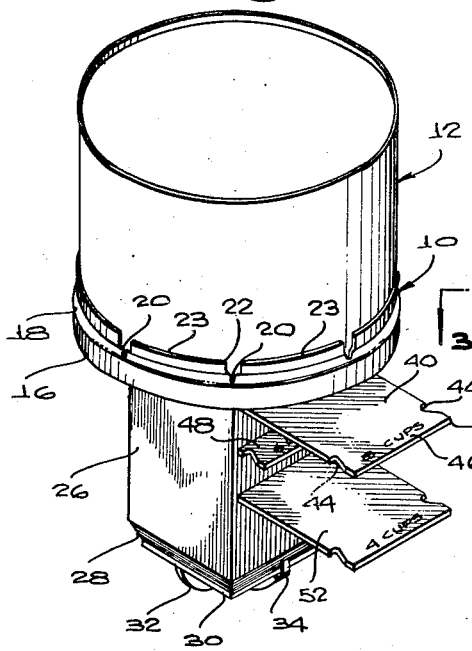
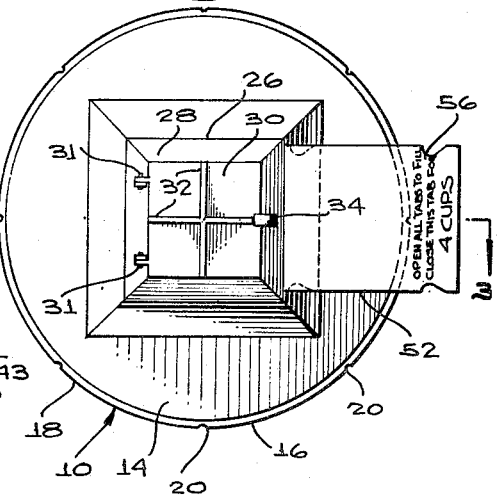
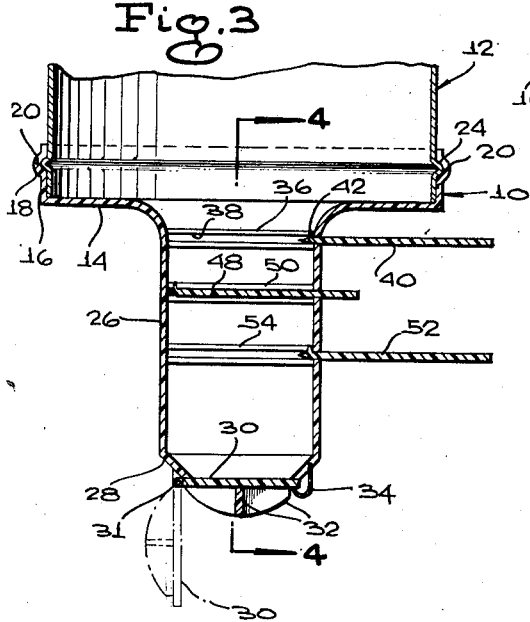
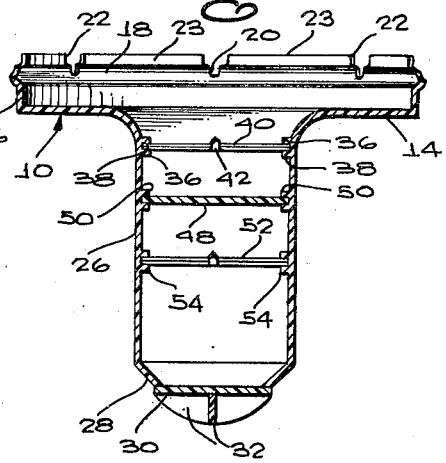
INVENTOR.
KENNETH B. KIDD
BY McMorrow, Berman + Davidson
ATTORNEYS

2,781,955
MEASURING DISPENSER FOR GRANULAR MATERIALS

Kenneth B. Kidd, Scottsdale, Ariz.

Application February 3, 1956, Serial No. 563,220

2 Claims. (Cl. 222—436)

This invention relates to dispensing devices, and more particularly, has reference to a dispensing device so designed as to be applicable to an opened can of coffee or the like, the device being provided with means for measuring out predetermined amounts of the coffee, to insure against wastage of the coffee and insure, further, the brewing of coffee uniformly and to the desired strength, in every instance.

Summarized briefly, the invention comprises a base plate so designed as to be engageable about the open end of a conventional pound coffee container, to provide a lid for said container usable in substitution of the lid normally associated therewith; a barrel rigid with the center portion of said base plate and communicating at one end with the interior of the coffee container, for gravitation of the coffee into the barrel responsive to inversion of the container; a plurality of slides mounted to shift transversely of the barrel at locations spaced longitudinally thereof, said slides being adapted to be usable selectively, for trapping material between the selected slide and that end of the barrel remote from the base plate, the slides having markings thereon to designate the number of cups of coffee to be brewed; and a latched closure carried by the second-named end of the barrel, said latched closure being adapted, when swung to an open position, to release the trapped material.

An object of importance is to provide a device of the type stated which will be particularly designed to permit the application of the device to the open ends of conventionally formed coffee cans.

Another object is to provide a device as stated which will be so formed as to be capable of manufacture at a minimum of cost.

Yet another object is to provide a device as stated which will have the slide markings so located as to permit said markings to be clearly visible both in the inverted and in the normal positions of the device.

Yet another object is to provide a measuring dispenser as described which, by reason of the particular formation and relative arrangement of the component parts thereof, will prevent wastage of coffee during the brewing of the same, and will further insure that the brewed coffee will always be uniform as to strength.

Other objects will appear from the following description, the claims appended thereto, and from the annexed drawing, in which like reference characters designate like parts throughout the several views, and wherein:

Figure 1 is a perspective view of a measuring dispenser formed in accordance with the present invention, as it appears when associated with a conventionally designed coffee container;

Figure 2 is a bottom plan view of the measuring dispenser;

Figure 3 is a sectional view on line 3—3 of Figure 2, the dotted lines showing the closure in its open position; and Figure 4 is a sectional view taken on line 4—4 of Figure 3.

The reference numeral 10 has been applied generally in the drawing to designate the measuring dispenser constituting the present invention. The reference numeral 12 has been similarly applied to designate a conventional container in which coffee is sold. Such a container would be one in which a pound of coffee is merchandised in a granular condition, the container being vacuum sealed and having a tear strip which, when removed, permits removal of one end of the container, said end thereafter serving as a lid.

In accordance with the present invention, the lid defined by removal of the tear strip of the container is discarded, and the measuring dispenser constituting the present invention is applied in substitution thereof.

The invention includes a circular, planiform base plate 14 integral at its periphery with a continuous flange 16 snugly engageable about the open end of the container 12 to provide a lid for said container. Flange 16 is integrally formed with a circumferentially extending, outwardly struck rib 18 defining an internal groove extending the full circumference of the inner surface of the flange. At equidistantly spaced locations throughout the circumference of the flange, the flange has transverse slots 20 the inner ends of which are relatively narrow and intersect with the internal groove of the flange, the outer ends of said slots being widened as at 22 (Figure 4). The slots define between them spring tongues 23, which tongues are adapted to grip the container wall tightly when the measuring device is applied thereto. In this connection, the container is provided wtih the usual outwardly struck, circumferential bead 24, that engages in the internal groove.

A barrel 26 is integrally formed upon the center portion of the base plate, the inner end of the barrel being in communication with the container interior, when the device is applied to the container. The barrel 26 is of rectangular cross section throughout its length, the barrel having, at that end thereof remote from the base plate, a tapered portion 28. The tapered end portion of the barrel 26 is formed with a dispensing opening, normally covered by a hinged closure 30. The closure 30 is pivotally connected to the wall of the barrel as at 31, the closure swinging between the full and dotted line positions shown in Figure 3. To facilitate grasping of the closure, said closure has, on its outer surface, crossing ribs 32 that define handle means on the closure.

For the purpose of releasably latching the closure in its closed position, a spring latch 34 of J-shape is anchored at one end to the wall of the barrel, the other end of the latch engaging the closure as shown in Figure 3. It will be understood that to unlatch the closure for movement to its open, dotted line position, one need only spring the latch 34 in a direction away from the closure, the latch thereafter returning to its normal position. When the closure is swung to the full line position shown in Figure 3, the closure will bias the latch outwardly to permit passage of the closure, after which the latch will engage the closure once again to hold the same in its closed position.

Within the barrel, I provide a plurality of slides, selectively shiftable transversely of the barrel. Adjacent the base plate 14, opposed, inwardly facing guide ribs 36 are formed on the inner surface of the barrel, the ribs 36 having guide grooves 38 formed therein (Figure 4). Slidably engaged at its opposite sides in the grooves 38 is a slide 40, formed at its inner end with an upwardly turned stop lug 42. The slide 40, when shifted to the right in Figure 3, will be limited against complete withdrawal from the barrel by engagement of the lug 42 against the barrel wall.

When the slide 40 is shifted to the left in Figure 3, so as to extend fully across the barrel, a portion of the slide will project exteriorly of the barrel to provide a lip 43. The lip 43 can be grasped as a handle, and to facilitate its being so grasped, the lip is formed, at opposite sides thereof, with notches or recesses 44.

When the container 12 is inverted with the measuring dispenser applied thereto, in the manner shown in Figure 1, the upwardly turned surface of the lip will be clearly visible to the user, and permanently marked on said upper surface is a legend 46, said legend in the illustrated example reading "8 cups."

Spaced longitudinally of the barrel 26 from the innermost slide 40 is an intermediate slide 48. This is formed identically to the slide 40, and is engaged in guides 50 formed upon the inner surface of the barrel. Slide 48 has, on the lip portion thereof, the legend "6 cups."

Spaced longitudinally of the barrel from the slides 40, 48 is a third slide, this being the outermost slide and being designated by the reference numeral 52. Slide 52 is identical to the slides 40, 48, and is engaged in grooved guides 54. The lip portion of slide 52 bears the legend "4 cups."

As will be noted from Figure 2, the underside of the slide 52, that is, that surface of the slide which faces downwardly when the device is operatively positioned for dispensing of coffee in the manner shown in Figure 1, bears a legend 56 reading "open all tabs to fill—close this tab for 4 cups." The corresponding surfaces of the slides 40, 48 would be similarly marked, except, of course, for being marked as being usable, respectively, for 8 and 6 cup quantities.

In use of the device, the container 12 would normally be positioned right side up, between uses of the measuring dispenser. At such time as a quantity of the coffee is to be measured out, for brewing of a selected number of cups of coffee, the container is inverted as shown in Figure 1, with all the slides pulled outwardly. This opens the interior of the barrel for gravitation of the granular coffee thereinto, the barrel filling with coffee due to the adjustment of all the slides to a withdrawn position.

Thereafter, and assuming for example that 6 cups of coffee are to be brewed, slide 48 is shifted inwardly as shown in Figure 3, to partition the interior of the barrel. This traps a predetermined quantity of coffee between the slide 48 and the closure 30, and it is now necessary that the closure 30 be swung to an open position, to dispense the trapped quantity.

It will be understood that the size of the barrel would be determined in advance, and under ordinary conditions, one might so dimension the barrel in the manufacture thereof as to cause two level teaspoons of coffee to be measured per cup to be brewed. The cubic dimensions of the barrel interior may, of course, be increased or decreased in commercial embodiments of the invention, to produce stronger or weaker coffee.

The entire device can be readily molded from clear plastic or similar material, although it will be understood that the particular materials can be varied, as desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A measuring dispenser for granular materials comprising: a base plate having a peripheral flange formed with a circumferential series of spring tongues engageable about the open end of a granular materials container, to provide a lid for said container; a barrel extending from said base plate in communication at one end with the container interior for gravitation of granular materials into the barrel responsive to inversion of the container; a plurality of slides spaced longitudinally of and selectively shiftable transversely of said barrel, for partitioning the same at a selected location intermediate its ends to trap material within the barrel between said location and the other end thereof; and a closure at said other end of the barrel for releasing the trapped material.

2. A measuring dispenser for granular materials comprising a base plate having a peripheral flange formed with an internal circumferential groove adapted to receive an outwardly directed, circumferential rib on an open end of a granular materials container, said flange having equidistantly spaced slots the inner ends of which intersect with said groove at spaced locations throughout the length of the groove, said slots being narrow at their inner ends and widening at their outer ends, the slots defining between them a circumferential series of spring tongues on said flange engageable about said open end of the granular materials container to detachably connect the base plate to the container as a lid therefor; a barrel extending from said base plate in communication at one end with the container interior for gravitation of granular materials into the barrel responsive to inversion of the container; a plurality of slides spaced longitudinally of and selectively shiftable transversely of said barrel, for partitioning the same at a selected location intermediate its ends to trap material within the barrel between said location and the other end thereof; and a closure at said other end of the barrel for releasing the rtapped material.

References Cited in the file of this patent

UNITED STATES PATENTS

| | | |
|---|---|---|
| 432,353 | Bachelder et al. | July 15, 1890 |
| 919,917 | McDuffie | Apr. 27, 1909 |
| 998,994 | Smith | July 25, 1911 |
| 2,072,938 | Berg | Mar. 9, 1937 |
| 2,207,395 | Brom | July 9, 1940 |